Patented Apr. 16, 1929.

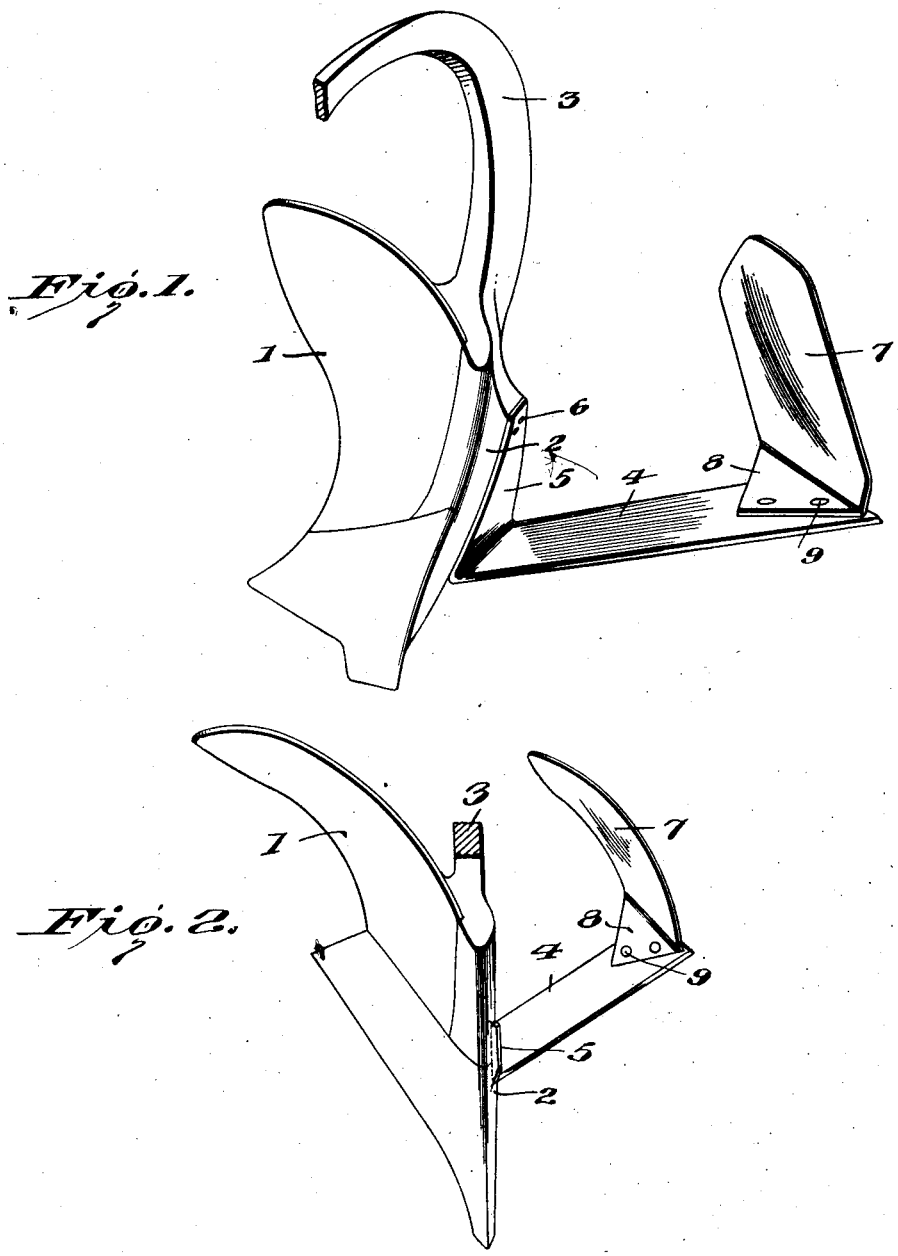

1,709,408

UNITED STATES PATENT OFFICE.

ARTHUR P. SCARBROUGH AND CURREY M. HOLT, OF HANFORD, CALIFORNIA.

EARTH-WORKING ATTACHMENT.

Application filed June 10, 1927. Serial No. 197,898.

This invention relates to improvements in earth working attachments for plows and similar cultivating devices, having for an object to provide a device adapted to be attached to the usual walking or gang plow especially advantageous for use in the turning of a furrow or working soil adjacent or in proximity to vegetation, as for example, trees, vines etc., without the need of a separate plow for such purpose as well as a separate and distinct plowing operation and without damaging in any way whatsoever, such vegetation, thus effecting a material saving of labor and expense upon part of a user.

The invention also aims to provide an attachment of the character mentioned which when connected to the landside of a plow or similar earth working device, will permit the turning of a double furrow, that is, a furrow by the primary plow and a furrow by the attachment, the latter furrow being made adjacent to and collectively with the forming of the first furrow, thereby dispensing with the need of a special type of plow for this purpose or the necessity of hoeing or similarly working such soil, all of which entails an additional expense.

Other objects of the invention will be in part obvious and in part pointed out hereinafter.

In order that the invention and its mode of operation may be readily understood by those skilled in the art, we have in the accompanying illustrative drawing and in the detailed following description based thereupon, set out one possible embodiment of the invention.

In these drawings:

Figure 1 is a perspective view of a walking type of plow equipped with the invention, and Figure 2 is another perspective view of the same with the draft beam cut away.

Having more particular reference to the drawings, in connection with which like characters of reference will designate corresponding parts throughout, I have shown for purposes of illustration herein, my improved furrow forming attachment used in connection with the usual type of walking plow including a mold board 1 and a landside portion 2 from which the usual draft beam 3 extends.

The attachment may be stated to consist of a supporting and securing arm or bar 4 formed of steel or of other metal possessing the necessary degree of rigidity and stability, the inner end of which is formed with a biased right angularly disposed extension and connecting plate 5 adapted to be secured through bolts, rivets or other suitable fastening devices 6 to the intermediate portion of the landside 2 of the plow, while the arm proper extends laterally and rearwardly in a diagonal direction from the said landside 2 as is shown in the Figure 1 to a point sufficiently distant from the same to permit of the forming of a furrow distinct and apart from that formed by the mold board 1 and the point of the equipped plow.

Fixedly mounted upon the outer extremity and rearwardly directed portion of the supporting arm 4 is an earth working blade 7 formed of that grade of metal ordinarily used in the construction of the now prevalent types of plows, said blade being of a size less than the size of the mold board 1 of the equipped plow but generally simulating the shape thereof as well as the positioning of the same with respect to the landside and point of the walking plow herein illustrated.

The lower portion of the earth working blade or shovel 7 is formed with a substantially right angularly disposed lip 8 adapted to flushly engage with the upper side of the free end of the arm 4 and should be fixedly engaged therewith through the medium of bolts, rivets or similar fastening devices 9, which, as will be noted, are passed through said lip and through adjacent portions of the arm 4, thereby rigidly and fixedly positioning the attachment proper with respect to the said arm 4 and the landside 2 of the equipped plow.

The upper or free portion of the earth working blade of the attachment is curved laterally and toward the landside portion 2 of the aforesaid plow and generally simulates its formation, the formation or curvature of the mold board 1 thereof, as is shown in the Figure 2; the forward or leading edge of the blade 7 being adapted to have a cleaving-like engagement with the soil to be worked thereby whereupon with a proper depth of the same in the soil and the drawing of the plow and the attachment forwardly therethrough, a furrow will be turned towards and adjacent to as well as in parallelism to the furrow turned by the simultaneously functioning mold board 1.

Because of the curvature of the working blade 7 toward the landside portion 2 of the equipped plow and away from rows of vegetation being cultivated, it will be understood that said blade will be permitted to pass by this vegetation without damaging the same in any manner whatsoever and yet, will be permitted to thoroughly and effectually work the soil in immediate proximity to the roots thereof. Furthermore, because of the particular formation of the earth working blade 7, it will be understood that with engagement of the same in the soil to the proper depth and its drawing forwardly through said soil, the blade will act in the fashion of a plow mold board in that it will engage and turn a furrow away from the leading or forward edge thereof.

Due to the detachable connection of the earth working blade of the attachment proper to the supporting arm 4, it will be understood that the same may be removed for repair or replacement, such as conditions or preference may dictate. Furthermore, by reason of the diagonally rearward disposition of a normally horizontally positioned supporting arm 4 with respect to the landside 2 of an equipped plow, it will be appreciated that the head or resistance of said bracket arm in engaging with and being moved through soil will be reduced to a minimum in that the leading edge of said arm will move through the soil in a substantially steering like fashion. However, under certain conditions, it may become desirable and preferable to extend the bracket arm 4 at true right angles with respect to the landside portion 2 of an equipped plow and under said conditions, it is of course to be understood that we consider modifications or adaptations of this character to be within the province of the invention.

Manifestly, the construction shown is capable of considerable modification and such modification as is within the spirit of our claims, we consider within the scope of our invention.

We claim:

1. The combination with a landside turning plow bottom including a mold board and a landside portion, of a cultivating attachment for the turning of the soil adjacent to or in proximity to the vegetation comprising a bar, means for attaching said bar to the landsiding portion of the plow bottom whereby it will extend laterally therefrom adjacent its lower edge, a blade secured to the opposite end of said bar and said blade being of a size less than that of the mold board but simulating the shape and position of the mold board.

2. The combination with a landside turning plow bottom including a mold board and a landside portion, of a cultivating attachment for the turning of the soil adjacent to or in proximity to the vegetation, comprising a rectangularly disposed extension and connecting plate formed with one end of said bar, means for attaching said plate to the intermediate portion of the landside portion of the plow bottom whereby said bar will extend laterally and rearwardly in a diagonal direction from the landside portion, an earth working blade secured to the opposite end of said bar and said blade being of less size than that of the moldboard, but simulating the shape and position thereof.

In witness whereof we have hereunto set our hands.

ARTHUR P. SCARBROUGH.
CURREY M. HOLT.